United States Patent [19]

Tou

[11] Patent Number: 4,727,115
[45] Date of Patent: Feb. 23, 1988

[54] MODIFICATION OF PYROLYTIC BEHAVIOR OF SYNTHETIC ABSORPTION RESINS THROUGH PENDANT DOUBLE BOND ELIMINATION

[75] Inventor: James C. Tou, Midland, Mich.

[73] Assignee: The Dow Chemical Company, Midland, Mich.

[21] Appl. No.: 345,252

[22] Filed: Feb. 2, 1982

[51] Int. Cl.$^4$ ................................................ C02F 8/22
[52] U.S. Cl. ................................ 525/332.2; 525/338; 525/356
[58] Field of Search ....................... 525/332.2, 338, 356

[56] References Cited

U.S. PATENT DOCUMENTS

| | | | |
|---|---|---|---|
| 2,578,937 | 12/1951 | Kunin et al. | 525/332.2 |
| 2,614,099 | 10/1952 | Bauman et al. | 525/356 |
| 2,629,710 | 2/1953 | McBurney | 525/332.2 |
| 2,788,330 | 4/1957 | Gilwood et al. | 525/332.2 |
| 3,009,906 | 11/1961 | Eichhorn et al. | 260/93.5 |
| 3,173,892 | 3/1965 | Kun | 525/332.2 |
| 3,625,927 | 6/1968 | Yoshimoto et al. | 260/85.1 |
| 3,652,517 | 3/1972 | Yoshimoto et al. | 525/338 |
| 3,696,088 | 10/1972 | DeVault | 260/85.1 |
| 3,810,957 | 5/1974 | Lunk | 260/876 B |
| 3,812,061 | 5/1974 | Barrett | 260/2.1 E |
| 3,975,334 | 8/1976 | Weinshenker | 525/332.2 |
| 3,997,706 | 12/1976 | Galeazzi | 525/332.2 |
| 4,020,250 | 4/1977 | Lal | 525/356 |
| 4,246,354 | 1/1981 | Herbin et al. | 525/332.2 |

Primary Examiner—Edward J. Smith
Assistant Examiner—Bernard Lipman

[57] ABSTRACT

Synthetic resins such as absorption resins which have been cross-linked with a molecule having pendant double bonds which reacted with a reactive molecule such as molecular halogen, to eliminate unreacted pendant double bonds present in the resin. This method renders the resin less susceptible to runaway thermal reactions which can cause the resin to burn.

7 Claims, No Drawings

MODIFICATION OF PYROLYTIC BEHAVIOR OF SYNTHETIC ABSORPTION RESINS THROUGH PENDANT DOUBLE BOND ELIMINATION

BACKGROUND OF THE INVENTION

This invention relates to synthetic polymeric resins suitable for use as absorption resins.

Absorption resins are polymeric compositions having a high surface to mass ratio ($\approx 400$ m$^2$/g), and are capable of absorbing large quantities of organic molecules. The general nature of absorption resins is well-known to those skilled in the art.

A typical absorption resin production involves the copolymerization of a noncross-linking monomer and a cross-linking monomer. Typical examples include styrene and divinylbenzene. Styrene and divinylbenzene are polymerized with the aid of an addition polymerization catalyst. After the polymerization is complete, the resin is ready for use.

References explaining the manufacture and use of absorption resins include U.S. Pat. Nos. 3,037,052; 3,109,486; 3,338,029; 3,468,103; 3,549,562; 3,586,646; 3,716,482; 3,748,829; 3,776,283; 3,881,894; 3,897,193 and 4,218,224.

While these resins have been widely accepted in the market place, and have been useful in commerical processes, however, unbeknownst to the users, these resins may pose significant safety hazards. Specifically, these resins may pose significant fire hazards under a wide variety of conditions. Accordingly, it would be desirable to have a separation resin which is not subject to these hazards.

SUMMARY OF THE INVENTION

Briefly, the invention is, in one aspect, a method of conditioning a cross-linked synthetic resin, comprising eliminating a significant number of the pendant unreacted double bonds. In another aspect, the invention is the resin produced by this method.

The resins produced according to the invention do not exhibit uncontrolled exothermic behavior. Further, these resins show no loss in absorption capacity, compared to resins not prepared according to the invention.

DETAILED DESCRIPTION OF THE INVENTION

It has now been discovered that absorption resins which are prepared with a cross-linking monomer pose a safety hazard under certainc onditions. Specifically, it has been found that not all of the pendant double bonds of the cross-linking monomer are reacted during the preparation of the resin. Further, it has been found that these double bonds may react with gases such as $O_2$, $NO_2$, etc., and in such reaction, release large amounts of heat. Since these resins are very effective thermal insulators, the heat is retained by the resin rather than being released to its surroundings. The result is that the temperature of the resin increases until it has reached a point that a runaway thermal reaction occurs. At this point, the resin begins breaking down its molecular composition at a very rapid rate, creating a substantial safety hazard. However, when the double bonds have been eliminated according to the practice of the invention, such a runaway thermal reaction is not observed.

Throughout the description of the invention, the term "double bond" is meant to include any carbon-to-carbon double bond which is addition polymerizable. Thus, in general, most terminal double bonds in hydrocarbon chains are included within this definition. However, most aromatic unsaturation is not included.

In accordance with the invention, an absorption resin is prepared by conventional means, well-known in the art of such resins, as taught by the references listed above. The resin is then conditions such that the numer of pendant unreacted double bonds is substantially reduced.

By the term "conditioned" is meant that the resin is under controlled conditions to remove the double bonds before it is used as an absorption resin.

The particular method used to eliminate the double bonds is unimportant so long as the elimination remains controlled and the end result of substantial elimination of the double bonds is achieved. By "controlled" is meant that the process must be regulated such that the resin does not build up a temperature sufficient to cause pyrolysis of the resin. While the maximum temperature will vary depending upon the resin composition, the temperatue should usually not exceed 150° to 200° C. The process may be controlled by limiting the rate of double bond elimination or providing a cooling means.

The preferred means of eliminating double bonds is treating the resin under controlled conditions with a reactive composition.

By the term "reactive composition" is meant to include any compound which will react with double bonds, which does not itself possess a double bond, which will not regenerate a double bond under absorption conditions and which will not be displaced by another compound under absorption conditions.

The preferred class of reactive compositions includes diatomic molecules wherein each atom is individually selected from the class consisting of halogens and hydrogen. A more preferred class consists of diatomic molecules wherein each atom is selected from the class consisting of hydrogen, chlorine, and bromine. Specifically, hydrohalogens such as HCl and HBr, halogens such as $BR_2$, $Cl_2$ and BrCl, and molecular hydrogen are exemplary reactants. Although the use of $H_2$ will require a catalyst, the resulting product would be expected to be more stable than a similar product prepared by the other compositions. Of course, mixtures of these compounds may be used.

The compound to be reacted with the pendant double bonds of the resin may be contacted with the resin in any manner convenient under the circumstances as long as the reaction remains "controlled," as the term is defined above. Typically, the resin will be packed into a small diameter absorption column and the reactive material may be passed through the column, contactng the resin. A small diameter column assists in heat dissipation. Any other convenient means will also be suitable. The resin is conveniently reacted with the double bond reactive composition after the resin is completely prepared and otherwise ready for use.

The resin is typically treated at ambient temperature. The reactive composition may be in either the gas phase or liquid phase, or may be a dissolved or suspended solid. A gas or liquid carrier may serve the dual functions of a carrier fluid and a cooling fluid.

The resin should be treated such that a significant number of double bonds are eliminated. By this is meant that the tendancy for the resin to undergo an exothermic reaction through its double bonds should be measurably reduced. Desirably, substantially all double bonds are eliminated during the treatment. In quantitative terms, any reduction in the number of double bonds contributes to the safety of the resin. Desirably, at least 50 percent of the double bonds originally present are eliminated. More desirably, at least 75 percent are eliminated. Preferably, at least 90 percent, more preferably, at least 95 percent and most preferably at least 97 percent of the double bonds originally present are eliminated by the treatment.

COMPARATIVE EXAMPLE 1

A typical absorption resin, prepared from 10 percent styrene and 90 percent commercial divinyl benzene (which contains 40 percent ethyl styrene) is studied by Differential Scanning Calorimetry) (DSC). With a DSC temperture programming rate of 20° C./min. and an air flow rate of 50 cc/min., the exothermic reaction is detected at 145° C. The heat of reaction with 1 percent $NO_2$ in air at 70° C. is 130 cal/g.

EXAMPLE 1

A resin sample identical to that used in Example 1 is packed into a standard absorption column having an inside diameter of ≅1 inch (≅254 mm). Ten percent $Cl_2$ in $N_2$ is passed through the column at ambient temperature at a flow rate of 1100 cc/min., causing a controlled exothermic reaction. When the reaction is complete (approximately 1.5 hours), the column and resin are purged with inert gas.

Following Comparative Example 1, the conditioned resin is evaluated by DSC. An exothermic reaction is now detected at 210° C. The heat of reaction with 1 percent $NO_2$ is now only 2.2 cal/g.

It is believed that the low temperature exothermic reaction and high heat of reaction with $NO_2$ of Comparative Example 1 is caused by the reaction of pendant double bonds on the polymer with compounds present in the air. This behavior is significantly modified in Example 1 by elimination of the pendant double bonds.

What is claimed is:

1. A method for reducing the pyrophoric behavior of a synthetic resin which resin has been prepared with greater than 20 percent of divinylbenzene, said method comprising conditioning the resin such that the number of dobule bonds. present in the resin is substantially reduced.

2. The method of claim 1 wherein the resin is contacted with a reactive material.

3. The method of claim 2 wherein the reactive material is a diatomic molecule wherein each atom individually comprises hydrogen or a halogen.

4. The method of claim 3 wherein each atom of the diatomic molecule is individually selected from hydrogen, chlorine or bromine.

5. The resin produced by the method of claim 1, 2, 3 or 4.

6. The method of claim 1 wherein the resin has been prepared with greater than 30 percent cross-linking monomer.

7. The method of claim 1 wherein the resin has been prepared with greater than 40 percent cross-linking monomer.

* * * * *